2,795,608

PRODUCTION OF HALOGENATED COMPOUNDS

Hyman M. Molotsky and Edward G. Ballweber, Chicago, Ill., assignors to Velsicol Chemical Corporation, Chicago, Ill., a corporation of Illinois No Drawing. Application March 13, 1956,
Serial No. 571,124

6 Claims. (Cl. 260—539)

This invention relates to a novel process for producing halogenated cyclic ketones. More specifically, the present invention relates to a process for producing hexachlorocyclopentenones by treatment of hexachlorocyclopentadiene with gaseous molecular oxygen.

The products produced by the process of the present invention are halogenated cyclic ketones having the structures:

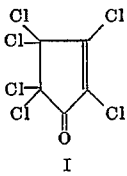  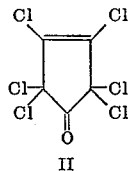

I  II

The compound of structure I has the chemical name 2,3,4,4,5,5-hexachloro-2-cyclopentenone, and the compound of structure II has the chemical name 2,2,3,4,5,5-hexachloro-3-cyclopentenone.

The above identified products are produced in high yield in accordance with the process of the present invention by passing molecular oxygen through hexachlorocyclopentadiene.

These compounds have utility as fungicides and insecticides. This activity is useful in many agricultural applications common to commercial pesticides and may also be used in the protection of industrial products from attack by fungus, rot, and mildew.

In addition to the above listed utility, these halogenated cyclic ketones have utility as chemical intermediates which are highly chlorinated, contain a reactive double bond, are cyclic in character, and contain a reactive ketone group.

Since the compounds heretofore described have so many properties which make them valuable both for agricultural applications and chemical synthesis, it would be desirable if such product could be produced by a process which is essentially economical, simple, and efficient. Prior to the present invention it was known that the compound 2,3,4,4,5,5-hexachloro-2-cyclopentenone could be prepared by treatment of octachlorocyclopentene with concentrated sulfuric acid, but such process produced only the single isomer and in addition used sulfuric acid in a highly concentrated form requiring special acid-proof equipment. Further, this process has the disadvantage that hydrogen chloride is produced as a by-product and presents a disposal problem.

The process of the present invention is unusual and unexpected in many respects. Particularly, the present process is unexpected in view of the fact that hexachlorocyclopentadiene is a rather inert material, with the exceptions of its reactivity in the diene synthesis and formation of ketals in the presence of alcohol and alkali. While the mechanism of the present process is not completely understood, inspection of the end products would indicate several steps of a complex nature. These steps would apparently include oxidation of carbon atoms within the cyclic ring without cleavage of the ring and migration of chlorine atoms in the ring. A process heretofore described for preparing one of the chlorinated cyclic ketones (McBee et al., U. S. Patent 2,650,939) mentions that a chlorocarbon ketone is not obtained from hexachlorocyclopentadiene treated with sulfuric acid. Sulfuric acid is a much stronger and active reagent than gaseous molecular oxygen and also an excellent oxidizing agent, and the process of the present invention using gaseous oxygen would appear highly improbable in view of the state of the art, particularly as shown in said recent patent. The process of the present invention is also valuable in that no special equipment need be used, since the starting material and the reagents are not corrosive to any degree approaching sulfuric acid.

It should be noted that no by-products are obtained from the present process. That is, none of the starting material is lost to side reactions so that relatively high yields of the desired compositions are obtainable. In addition, the absence of undesired by-products further enhances the economics of the process as compared to processes already known to the art by eliminating the need for by-product recovery systems which oftentimes are more elaborate and costly than the basic process equipment.

Broadly, the process of the present invention comprises treating hexachlorocyclopentadiene with oxygen at an elevated temperature.

The oxygen utilized in the present process is preferably substantially pure gaseous oxygen such as is available commercially in pressurized cylinders, but air containing oxygen diluted with relatively inert gases, may also be utilized. Since the molecular oxygen is the active component in the present process, a greater rate of reaction is obtained by the use of relatively pure oxygen than by the use of the less preferred air which contains oxygen diluted with inert gases, notably nitrogen. However, both are suitable in the present process to produce comparable products.

Generally, the oxygen may be introduced into the hexachlorocyclopentadiene by a bubbling technique using a pipe orifice placed below the surface of the liquid. Sintered glass or porous clay may be used, and are preferred means to disseminate the oxygen throughout the liquid hexachlorocyclopentadiene. Rapid stirring during the reaction is also useful in the dispersion of the gaseous reactant. Other techniques such as the use of tall towers containing the hexachlorocyclopentadiene may also be used to gain a prolonged interfacial contact between the gas bubbles and the hexachlorocyclopentadiene, thus utilizing the oxygen to its greatest advantage. The use of continuous reactors whereby the air or molecular oxygen is forced countercurrently through a continuously moving stream of hexachlorocyclopentadiene is also advantageous.

The process of the present invention is carried out by contacting oxygen with hexachlorocyclopentadiene while heating the hexachlorocyclopentadiene at a temperature between about 40° C. and 300° C., and a preferred temperature is between about 90° C. and 150° C. The time of reaction may vary and generally it does vary with the temperature and pressure.

In addition, the rate of oxygen influx has an effect on the time required to produce a reasonable yield of the product, and at high rates of oxygen influx, shorter times are ordinarily required. Further, the degree of foaming or size of bubbles, contact time and the like, all have an influence on the rate of reaction and should be taken into consideration in the determination of the desirable reaction time. Generally, the time of reaction may vary from about 5 hours to about 250 hours.

The rate of oxygen influx may vary, but generally it has been found that rates of from about 200 to about 1500 cc. per minute per mole of hexachlorocyclopentadiene are satisfactory, although greater or lesser rates of influx can be maintained. If a greater rate of oxygen gas influx is maintained, a shorter period of time is necessary to obtain a satisfactory yield of ketone, while a lower rate of influx will require a correspondingly longer time.

It is preferred to maintain saturation of the hexachlorocyclopentadiene with gaseous oxygen. By using superatmospheric pressures, the reaction time can be lessened, the reaction temperature maintained in the desired range where no discoloration or side products are produced, and the reaction can be made to go further toward completion. Thus, the use of higher pressures up to about 200 pounds per square inch is desirable although not essential to the present process.

Also, the use of catalysts, such as benzoyl peroxide and ultraviolet light, can improve the reaction time and degree of completion. The use of catalysts, like the use of superatmospheric pressure, is advantageous, but not necessary.

In addition, the process is readily adaptable to produce the hydrolyzation product of the aforementioned cyclopentenones, namely pentachloropentadienoic acid in a one-step operation by adding a small quantity of virtually any known hydrolyzation agent ($H_2O$, $H_2SO_4$, etc.) to the reaction mixture. The hydrolyzation agent can be added to the hexachlorocyclopentadiene, to the reaction product, or at any interval during the reaction. This acid, like the ketone, is well known to the art, having utility as a herbicide.

The following examples will illustrate the preparation of the hexahalogenated cyclic ketones by the process of the present invention:

*Example I*

Gaseous oxygen was bubbled through 500 g. of hexachlorocyclopentadiene for a period of 96 hours at a rate of 1200–1500 cc./minute while the temperature of the reaction mixture was maintained at 95–105° C. The reaction mixture was permitted to cool and nitrogen gas bubbled through the product to remove soluble, gaseous oxygen. A solid precipitated which was recovered by filtration. This solid had a melting point of 86.5–88.5° C. when crude and was identified as hexachloro-3-cyclopentenone by infra red spectroscopy through comparison of the product with an analytical sample of hexachloro-3-cyclopentenone prepared by methods known to the art. The melting point of this isomer is cited in the literature as 92° C. The filtrate was fractionally distilled under vacuum and two fractions were recovered. That fraction boiling at 72° C., 0.8 mm. Hg pressure was identified as the hexachloro-3-cyclopentenone isomer, and a fraction boiling at 80° C. and 0.9 mm. Hg pressure was identified as hexachloro-2-cyclopentenone by infrared spectroscopy comparison of the product with an analytical sample of hexachloro-2-cyclopentenone prepared by methods known to the art. The refractive index of this fraction was $n_D^{20}$ 1.5633. The melting point of 2,3,4,4,5,5-hexachlorocyclo-2-pentenone is cited in the literature as 28° C. Resolution of the entire product indicated combined yields as follows:

Hexachloro-3-cyclopentenone 41%
Hexachloro-2-cyclopentenone 26.7%
The remaining material up to 100% was essentially unreacted hexachlorocyclopentadiene which can be recycled in the process.

*Example II*

Into a three-necked, round-bottomed flask was placed 1000 g. of hexachlorocyclopentadiene. Gaseous oxygen was bubbled in below the surface of the liquid and the contents of the flask were stirred vigorously. The contents of the flask were maintained at a temperature of about 205 to 220° C. while the rate of oxygen influx was from about 600 to 800 cc. per minute. The reaction was continued for a period of 168 hours. At the end of this time the refractive index of the crude product was $n_D^{23}$ 1.5668. Examination of the product by infrared spectroscopy indicated a yield of from about 30 to 35% of the mixed isomers of hexachlorocyclopentenone.

*Example III*

Into a three-necked, round-bottomed flask was placed 1000 g. of hexachlorocyclopentadiene. Gaseous oxygen was bubbled in below the surface of the liquid and the contents of the flask were stirred vigorously. The contents of the flask were maintained at a temperature of about 30 to 40° C. while the rate of oxygen influx was from about 600 to 800 cc. per minute. The reaction was continued for a period of 72 hours. Examination of the product by infrared spectroscopy by comparison with analytical samples of the hexachlorocyclopentenones prepared by methods known to the art indicated a yield of about 10% of a mixture of the isomers of the hexachlorocyclopentenones.

*Example IV*

Into a three-necked, round-bottomed flask is placed 1,000 g. of hexachlorocyclopentadiene. Air is bubbled in below the surface of the liquid and the contents of the flask are stirred vigorously. The contents of the flask are maintained at a temperature of about 205 to 220° C. while the rate of air influx is about 600 to 800 cc. per minute. The reaction is continued for a period of 170 hours to result in the production of a mixture of isomers of hexachlorocyclopentenone.

*Example V*

Gaseous oxygen is bubbled through 500 g. of hexachlorocyclopentadiene, to which is added 6 g. of $H_2SO_4$, while the temperature of the reaction mixture is maintained at 95–105° C. The reaction mixture is permitted to cool and nitrogen gas bubbled through the product to remove soluble, gaseous oxygen. A substantial yield of pentachloropentadienoic acid, the hydrolyzation product of hexachloro-3-cyclopentenone and hexachloro-2-cyclopentenone, is obtained.

The foregoing examples illustrate the general method of preparing halogenated cyclic ketones by the process of the present invention. These examples are not intended to limit the process to the conditions shown therein but merely to show the results obtained in practice and to exemplify the application of the present process.

As is shown by the specification and the examples, the present process is an unexpected but very convenient method of producing hexachlorocyclopentenones from hexachlorocyclopentadiene by a direct, one-step oxidation heretofore unknown to the art. A particular advantage of the process is the preparation of 2,2,3,4,5,5-hexachloro-3-cyclopentenone directly by a one-step operation without first making its isomer which is necessary in all methods known to the art. Newcomer and McBee in vol. 71, J. A. C. S., page 947, in connection with the preparation of the ketones from octachlorocyclopentene by action of sulphuric acid, state: ". . . hexachloro-3-cyclopentenone could have been formed only through a rearrangement . . . the ketone melting at 28° was the only product . . ." Consequently, the process of the present invention, in addition to presenting a novel, unexpected method of producing hexachlorocyclopentenone, also provides a direct method for producing the 2,2,3,4,5,5-hexachloro-3-cyclopentenone isomer, heretofore shown by the art to be produced only indirectly by rearrangement of its isomer.

While, as was stated previously, the mechanism of the reaction is unknown, there is believed to be an intermediate epoxide formed from which the respective isomers result, depending on the direction in which the epoxide ring is broken. The fact that 2,2,3,4,5,5-hexachloro-3-cyclopentenone is formed by the process of the present invention at 90° C. in yields previously only obtainable by rearrangement of its isomer at temperatures in the range of 290° C. also was unexpected and exemplifies the novelty of the process of the present invention.

We claim:
1. A process for preparing hexachlorocyclopentenones which comprises passing gaseous oxygen through hexachlorocyclopentadiene at a temperature between about 40° C. and 300° C.
2. A process for preparing hexachlorocyclopentenones which comprises passing a stream of gaseous oxygen in a disseminated state through hexachlorocyclopentadiene at a temperature between about 90° C. and 150° C.
3. A process for preparing 2,3,4,4,5,5-hexachloro-2-cyclopentenone which comprises passing a stream of gaseous oxygen through hexachlorocyclopentadiene at a temperature between about 40° C. and 300° C. for from about 5 hours to about 250 hours and recovering therefrom as the product of the process 2,3,4,4,5,5-hexachloro-2-cyclopentenone.
4. A process for preparing 2,2,3,4,5,5-hexachloro-3-cyclopentenone which comprises passing a stream of gaseous oxygen through hexachlorocyclopentadiene at a temperature between 90° C. and 150° C. for from about 20 hours to about 250 hours and recovering therefrom as the product of the process 2,2,3,4,5,5-hexachloro-3-cyclopentenone.
5. A process for preparing hexachlorocyclopentenones which comprises passing gaseous oxygen through hexachlorocyclopentadiene at a rate of at least 200 cc. per minute per mol of hexachlorocyclopentadiene at a temperature from between 40° C. and about 300° C. for from about 5 hours to about 250 hours under pressure of from about atmospheric up to about 200 pounds per square inch.
6. The process of claim 1 in which a hydrolyzation agent is incorporated into the reaction mixture, and recovering therefrom as the product of the process pentachloropentadienoic acid.

No references cited.